United States Patent
Sakama et al.

(10) Patent No.: US 7,256,697 B2
(45) Date of Patent: Aug. 14, 2007

(54) RADIO FREQUENCY IC TAG AND BOLT WITH AN IC TAG

(75) Inventors: Isao Sakama, Hiratsuka (JP); Minoru Ashizawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 177 days.

(21) Appl. No.: 11/010,300

(22) Filed: Dec. 14, 2004

(65) Prior Publication Data

US 2006/0022056 A1 Feb. 2, 2006

(30) Foreign Application Priority Data

Jul. 28, 2004 (JP) .............................. 2004-219678

(51) Int. Cl.
*G08B 13/14* (2006.01)

(52) U.S. Cl. ............................... 340/572.8; 340/572.1; 340/572.7; 343/700 MS

(58) Field of Classification Search .. 340/572.1–572.9; 343/700 MS

See application file for complete search history.

(56) References Cited

U.S. PATENT DOCUMENTS

| | | | |
|---|---|---|---|
| 5,394,159 A | | 2/1995 | Schneider et al. |
| 5,608,417 A | * | 3/1997 | de Vall ........................ 343/895 |
| 5,880,675 A | * | 3/1999 | Trautner ................... 340/572.8 |
| 5,912,622 A | * | 6/1999 | Endo et al. ............... 340/572.5 |
| 5,995,048 A | | 11/1999 | Smithgall et al. |
| 6,049,278 A | * | 4/2000 | Guthrie et al. ........... 340/572.7 |
| 6,204,771 B1 | * | 3/2001 | Ceney ........................ 340/665 |
| 6,239,737 B1 | * | 5/2001 | Black ........................... 342/51 |
| 6,375,780 B1 | * | 4/2002 | Tuttle et al. ................. 156/226 |
| 6,452,497 B1 | * | 9/2002 | Finlayson ................. 340/572.8 |
| 6,494,305 B1 | * | 12/2002 | Black et al. ................. 198/349 |
| 6,814,287 B1 | * | 11/2004 | Chang et al. ............... 235/451 |
| 6,897,827 B2 | * | 5/2005 | Senba et al. ................. 343/873 |
| 7,009,506 B2 | * | 3/2006 | Wilson et al. .............. 340/445 |
| 2003/0156033 A1 | | 8/2003 | Savage et al. |
| 2003/0169207 A1 | | 9/2003 | Beigel |
| 2004/0201524 A1 | * | 10/2004 | Yuanzhu .............. 343/700 MS |
| 2005/0197074 A1 | * | 9/2005 | Cullen et al. .............. 455/90.3 |

FOREIGN PATENT DOCUMENTS

| | | |
|---|---|---|
| DE | 10056473 | 1/2002 |
| JP | 2000/304870 | 11/2000 |
| JP | 2003-234673 | 8/2003 |
| JP | 2004-127057 | 4/2004 |

* cited by examiner

*Primary Examiner*—Jeffery Hofsass
*Assistant Examiner*—Hoi C. Lau
(74) *Attorney, Agent, or Firm*—Mattingly, Stanger, Malur & Brundidge, P.C.

(57) ABSTRACT

A radio frequency IC tag includes an antenna substrate accommodated on a bottom portion of an outer casing and an antenna radiation portion mounted on a surface of the antenna substrate. These parts are encapsulated by a sealing agent. An IC chip is disposed at a substantial center on a backside of the antenna substrate. A ground pattern connected to an electrode terminal of the IC chip is formed in an area, on which the IC chip is not mounted. A through electrode passes through the antenna substrate from its back surface to above its front surface at a position slightly offset from the center thereof. The through electrode is connected to the antenna radiation portion on the front surface and to the electrode terminal of the IC chip on the back surface.

18 Claims, 6 Drawing Sheets

US 7,256,697 B2

RADIO FREQUENCY IC TAG AND BOLT WITH AN IC TAG

CROSS-REFERENCES TO RELATED APPLICATIONS

The present application claims priority from Japanese application serial no. 2004-219678, filed on Jul. 28, 2004, the content of which is hereby incorporated by reference into this application.

BACKGROUND OF THE INVENTION

Radio frequency IC tags are currently widely used in information management and logistics control of articles. The radio frequency IC tags are also affixed to metallic materials used as base members for structures. Such IC tags are used for assembly control, inventory control, and the like of structures. The radio frequency IC tag, such as those described above, includes a small IC chip and a small antenna. The small IC chip is adapted to record information thereon. The small antenna is operative to transmit information stored on the IC chip wirelessly. The radio frequency IC tag may, for example, be applied as below. Specifically, a small IC chip measuring about 0.4 mm wide, about 0.4 mm long, and about 0.1 mm high is affixed to a metallic material at a location near a center of a half-wave ($\lambda/2$) dipole antenna.

FIGS. 7A and 7B are views showing a state in which a conventional radio frequency IC tag is affixed to a metal pipe. FIG. 7A is a perspective view and FIG. 7B is a fragmentary cross-sectional view taken along line E-E of FIG. 7A. As shown in FIGS. 7A and 7B, a radio frequency IC tag 41 is affixed to a surface of a metal pipe 42 using an adhesive or the like. With this arrangement, information stored on the IC chip (that is, control information concerning attributes of the metallic material, such as material, dimensions, and the like) can be read in a non-contact fashion by bringing a reader (not shown) close to the radio frequency IC tag 41.

Another technique for controlling information is also widely known. In this technique, an IC tag is affixed to a metallic object, such as an aluminum packaging material, a metal can, and the like. The IC tag contains information of various kinds that range from contents, manufacture, an expiration date, and the like. In applications such as that cited above, in which the IC tag is affixed to a metallic object, a measure is taken to prevent reading of the IC tag from becoming erratic as affected by a magnetic field produced by the metallic object. The measure taken may, for example, be a laminated structure of a resin plate, an insulation film, and an IC tag stacking of one on top of another. The resin plate includes a ferrite powder with a predetermined magnetic permeability (see, for example, Japanese Patent Laid-open No. 2004-127057 (paragraph numbers 0014 through 0029, and FIG. 1), hereinafter referred to as "Patent Document 1").

Conventionally, the radio frequency IC tag 41 is affixed to the surface of the metal pipe 42 as shown in FIGS. 7A and 7B. This arrangement causes the radio frequency IC tag 41 to protrude from the surface of the metal pipe 42. There is therefore a problem in that the radio frequency IC tag 41 tends to peel off the surface of the metal pipe 42. Take, for example, a case, in which a radio frequency IC tag using a strip antenna is to be affixed to a metallic material. In such a case, the radio frequency IC tag is affixed to the metallic material by way of a relatively thick insulation film interposed therebetween. This is done to prevent radio frequency characteristics of the antenna from being affected by the metallic material. This results in the radio frequency IC tag 41 protruding so excessively from the surface of the metal pipe 42 that the IC tag 41 is easily peeled off.

In the technique disclosed in Patent Document 1, the resin plate, the insulation film, and the IC tag are stacked one on top of another and affixed to the metallic object to prevent radio waves transmitted from the IC tag from being affected by the metallic object. This arrangement results in the IC tag protruding substantially from the surface of the metallic object. The IC tag therefore may easily come off.

BRIEF SUMMARY OF THE INVENTION

According to an aspect of the present invention, there is provided a radio frequency IC tag, including an IC chip for storing information, and an antenna for transmitting wirelessly the information stored on the IC chip. The radio frequency IC tag includes: an antenna substrate on one surface of which the IC chip is mounted at a substantial center of the surface, and which has a ground pattern formed at an area on which the IC chip is not mounted and electrically connected to the IC chip, the antenna substrate having a predetermined dielectric constant; an antenna radiation portion mounted on the other surface of the antenna substrate and electrically connected to an electrode terminal of the IC chip; and an outer casing accommodating therein the antenna substrate and the antenna radiation portion. In this case, the outer casing has, for example, a cylindrical outer surface or a threaded outer surface.

According to another aspect of the present invention, there is provided a bolt with an IC tag. The bolt with an IC tag includes a radio frequency IC tag mounted on a bolt. The radio frequency IC tag includes an IC chip for storing information and an antenna for transmitting wirelessly the information stored on the IC chip. A hole adapted to receive the radio frequency IC tag is formed in a head portion of the bolt. The radio frequency IC tag is stored in the hole so as not to protrude therefrom.

In this case, the antenna includes, for example, a disk disposed at a position corresponding to a surface portion of the head portion of the bolt. A connection wire is extended from a center of the disk and connected to an electrode terminal of the IC chip. The distance from the disk to the electrode terminal of the IC chip is set to $\lambda/4$, wherein the wavelength of a radio wave on the antenna substrate is $\lambda$. The antenna may be a monopole antenna.

DETAILED DESCRIPTION OF THE INVENTION

Outline of the Invention

Figure 1A:
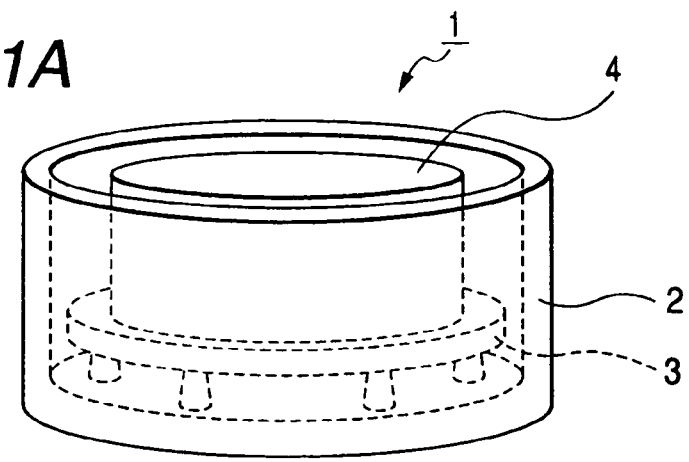
FIGS. 1A to 1C are views showing a structure of a radio frequency IC tag according to a first preferred embodiment of the present invention, FIG. 1A being a perspective view showing the appearance, FIG. 1B being a top view, and FIG. 1C being a cross-sectional view taken along line A-A of FIG. 1B.

The overview of a radio frequency IC tag according to the present invention will be described. The radio frequency IC tag according to the present invention uses an antenna of a microstrip configuration. The microstrip configuration ensures that antenna characteristics are not degraded even if the IC tag is mounted on a metallic material. At the same time, the antenna radiation portion is formed with a thick metal so as to provide a radiation surface for radio waves. The thick metal antenna radiation portion and the IC chip are filled with a resin or the like into the interspaces thereof. The radio frequency IC tag is thus offered as a sturdy, waterproof resin encapsulated structure. In addition, an entire body of the radio frequency IC tag is embedded and secured in the metallic material. The thick metal antenna portion serving as a radio wave radiation surface is exposed to the surface of the metallic material.

A radio frequency IC tag according to preferred embodiments of the present invention will be described in detail with reference to the accompanying drawings. Common parts depicted in drawings used in different preferred embodiments of the present invention are denoted by the same reference numerals.

Embodiment 1

Figure 1B:
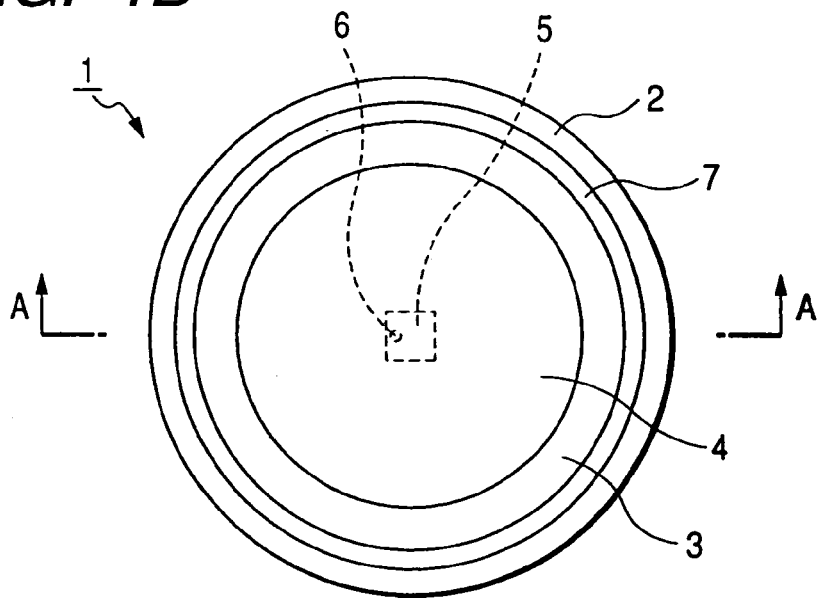
Figure 1C:
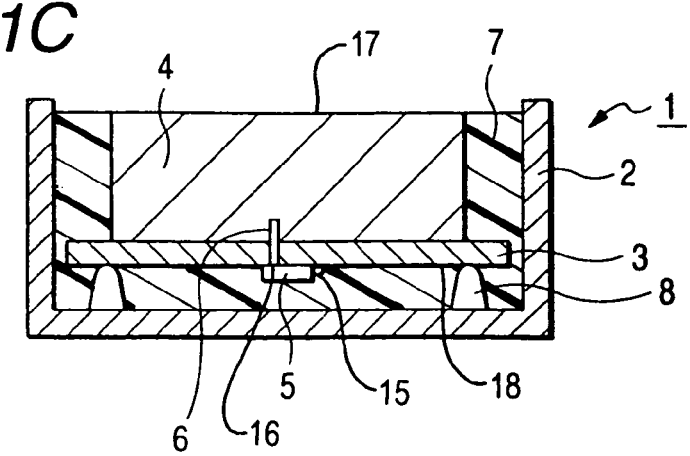

FIGS. 1A to 1C are views showing a structure of a radio frequency IC tag according to a first preferred embodiment of the present invention. FIG. 1A is a perspective view showing the appearance of the radio frequency IC tag. FIG. 1B is a top view of the radio frequency IC tag. FIG. 1C is a cross-sectional view taken along line A-A of FIG. 1B. Referring to FIG. 1A, a radio frequency IC tag 1 includes an antenna substrate 3 and an antenna radiation portion 4 which are accommodated in an outer casing 2. The outer casing 2 is formed of metal, such as iron, stainless steel, aluminum, or the like, or resin, such as Polyvinyl Chloride (PVC), Acrylonitrile Butadiene Styrene polymer (ABS), or the like. The antenna substrate 3 is formed of glass epoxy board or the like. The antenna radiation portion 4 is formed of metal. To explain in greater detail, referring to FIGS. 1B and 1C, the antenna substrate 3 is placed on top of support members 8 made of resin and formed on a bottom portion of the outer casing 2. The antenna radiation portion 4 is made of metal and formed into a thick cylindrical column which is mounted on the antenna substrate 3. The support members 8 are protrusions for controlling a height of the antenna substrate 3 relative to the bottom portion of the outer casing 2.

A through electrode 6 penetrates through a through hole provided at a position slightly offset from the center of the antenna substrate 3. The through electrode 6 extends from the rear surface to above the front surface (i.e. upper surface in FIG. 1C) of the antenna substrate 3. An IC chip 5 is disposed on a backside of the antenna substrate 3 to cover an area that extends from a position corresponding to the through electrode 6 to the center part of the antenna substrate 3. Further, a ground pattern 18 is formed to cover substantially the entire surface of the backside of the antenna substrate 3, except the area on which the IC chip 5 is disposed. A first electrode terminal 15 of the IC chip 5 is electrically connected to the ground pattern 18, and a second electrode terminal 16 of the IC chip 5 is connected to the through electrode 6. The antenna radiation portion 4 made of metal and formed into the thick cylindrical column is mounted on the front side of the antenna substrate 3 at the center thereof. The antenna radiation portion 4 is connected to the through electrode 6. A head 17 of the cylindrical column of the antenna radiation portion 4 is substantially as high as, or slightly lower than, the outer casing 2. A sealing agent 7, such as an epoxy resin or the like used as a semiconductor packaging material, is injected into the inside of the outer casing 2 and then cured. Thus, the radio frequency IC tag 1 is achieved as configured as shown in FIGS. 1A to 1C.

An antenna of a microstrip structure is herein achieved through the arrangement, in which ground pattern 18 is formed on the backside of the antenna substrate 3 and the antenna radiation portion 4 is formed on the front side thereof. Radio waves from the antenna radiation portion 4 can therefore be prevented from being affected by the metallic portions located therearound through a shield function of the ground pattern 18. When the radio frequency IC tag is attached to a metal bar as a controlled material, therefore, there is no likelihood that the antenna radio waves are absorbed by a metallic material existing at any location below the bottom portion of the outer casing 2. The antenna radiation portion 4 can therefore secure effective directivity of radio waves at the head 17 of the cylindrical column. That is, if an ordinary strip antenna (an antenna having no ground patterns on the backside of the substrate) is disposed on the surface of a metal or the like, radio waves of the antenna are absorbed by the metal, causing the radio waves to lose directivity. In contrast, the microstrip antenna structure, as described above, allows directivity of the radio waves to be properly maintained even if the antenna is disposed on the surface of a metal or the like.

The through electrode 6 is disposed slightly offset from the center of the antenna radiation portion 4 in the antenna substrate 3. This is done to achieve impedance matching of the antenna. Specifically, since there is zero potential at the center of the antenna radiation portion 4, the electrode terminal of the IC chip is connected at a position slightly deviated from the center of the antenna radiation portion 4, thereby achieving impedance matching between the IC chip and the antenna.

The diameter of the cylindrical column of the antenna radiation portion 4 is set to $\lambda/2$ when the wavelength of the radio wave on the antenna substrate is λ. Specifically, varying the dielectric constant of the antenna substrate 3 changes a resonance frequency of the antenna substrate 3. This, in turn, means that, by varying the dielectric constant of the antenna substrate 3, the diameter of the antenna radiation portion 4 can be selectively varied. To state it another way, selecting the dielectric constant of the antenna substrate 3 (that is, selecting the material of the antenna substrate 3) allows the diameter of the antenna radiation portion 4 to be determined. Herein, the diameter of the antenna radiation portion 4 can be made small to build a small radio frequency IC tag by making the dielectric constant of the antenna substrate 3 large. The diameter of the antenna radiation portion 4 made small, however, results in radiation characteristics of the radio waves being aggravated. It is therefore desirable that the material of the antenna substrate 3 be selected such that trade-off between a smaller antenna substrate 3 and degraded radio wave radiation characteristics is optimized. The diameter of the antenna radiation portion 4 is thereby optimally established.

Use of the radio frequency IC tag on a relatively large-sized metal bar or metal pipe is herein assumed. If, for example, the antenna substrate 3 having a dielectric constant of 10 is selected with a special emphasis placed on wave radiation characteristics rather than compactness, the diameter of the cylindrical column of the antenna radiation portion 4 is 24 mm. At this time, a radio frequency IC tag can be realized of a cylindrical column that measures 36 mm in diameter and about 16.6 mm in height. The height of the antenna radiation portion 4 is set to a value more than a machining margin of a controlled material (e.g., a metal bar or the like), on which the radio frequency IC tag 1 is mounted.

Figure 2A:
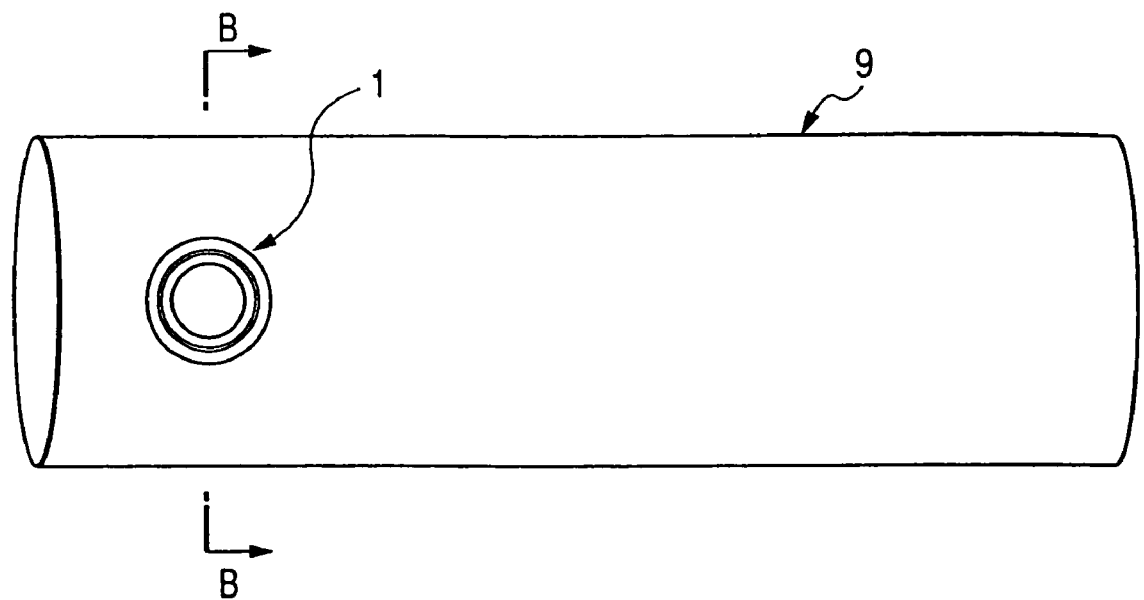
FIGS. 2A and 2B are views showing a state in which the radio frequency IC tag shown in FIGS. 1A through 1C is mounted on a metal bar, FIG. 2A being a perspective view showing the appearance of the radio frequency IC tag mounted on the metal bar, and FIG. 2B being an enlarged fragmentary cross-sectional view taken along line B-B of FIG. 2A.
Figure 2B:
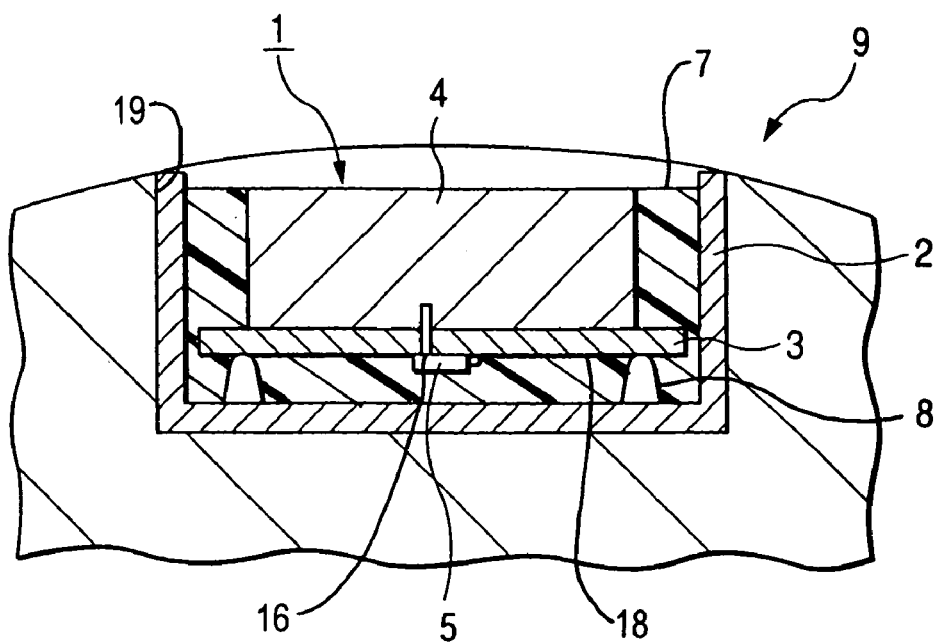

FIGS. 2A and 2B are views showing a state in which the radio frequency IC tag shown in FIGS. 1A through 1C is mounted on a metal bar 9. FIG. 2A is a perspective view showing the appearance of the radio frequency IC tag mounted on metal bar 9. FIG. 2B is an enlarged partial cross-sectional view taken along line B-B of FIG. 2A. Specifically, a hole 19 with a desired diameter and a desired depth is made in a metal bar 9. The radio frequency IC tag 1 as configured as shown in FIGS. 1A through 1C is then press-fitted into hole 19. This allows the radio frequency IC tag 1 to be stably secured in metal bar 9. The radio frequency IC tag 1 is press-fitted into the hole until the head of the antenna radiation portion 4 is substantially flush with a surface of metal bar 9. This eliminates the possibility that the radio frequency IC tag 1 protrudes from the surface of the metal bar 9. The radio frequency IC tag 1 can therefore be secured in the metal bar 9 even more stably. When a reader (not shown) is then brought near to the antenna radiation portion 4 of the radio frequency IC tag 1 secured in the metal bar 9, the reader can easily read information stored on the IC chip 5 through transmission and reception of radio waves between the reader and the antenna radiation portion 4. Moreover, the diameter of the antenna radiation portion 4 is relatively large to ensure directivity covering radio waves going in wider directions. The reader can therefore read data of the radio frequency IC tag 1 easily over a relatively wide range.

The metal bar 9 may be ground or otherwise machined after the radio frequency IC tag 1 has been press-fitted into metal bar 9. Thus, the height of the cylindrical column of the antenna radiation portion 4 in the radio frequency IC tag 1 is set to a level deeper than, and according to, the machining margin. Even if the metal bar 9 is machined, therefore, the cylindrical column of the antenna radiation portion 4 is left unmachined. As a result, the antenna characteristics are maintained. Even if the metal bar 9 is machined as necessary at an assembly stage of a structure, therefore, there is no likelihood that the radio frequency IC tag 1 will become disabled, thus enhancing usability.

The arrangements made for the radio frequency IC tag as described in the foregoing allows the IC tag to be embedded in the metallic material, so that it may be a controlled material. This eliminates the possibility of the radio frequency IC tag being peeled off from the metallic material. There is also relatively less chance of the radio frequency IC tag being damaged through contact with other objects. It is therefore possible to carry out communications stably between the radio frequency IC tag and the reader at all times. The information stored on the IC chip can, therefore, be read accurately and positively.

Embodiment 2

Figure 3A:
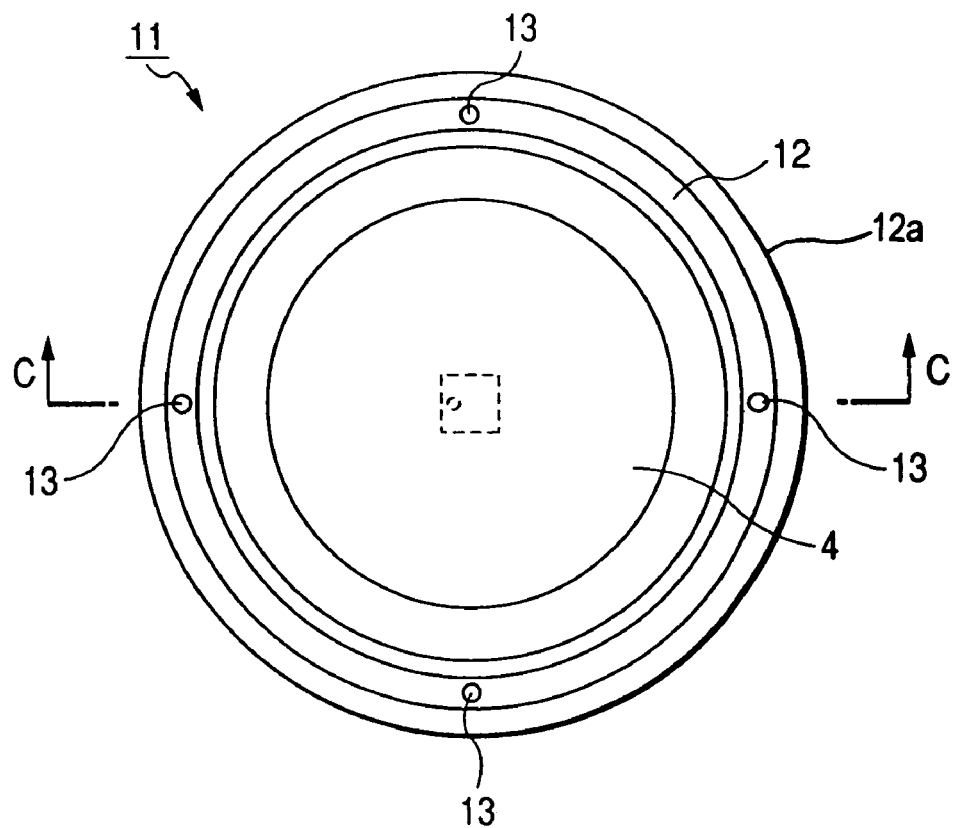
FIGS. 3A and 3B are views showing a structure of a radio frequency IC tag according to a second preferred embodiment of the present invention, FIG. 3A being a top view, and FIG. 3B being a cross-sectional view taken along line C-C of FIG. 3A.
Figure 3B:
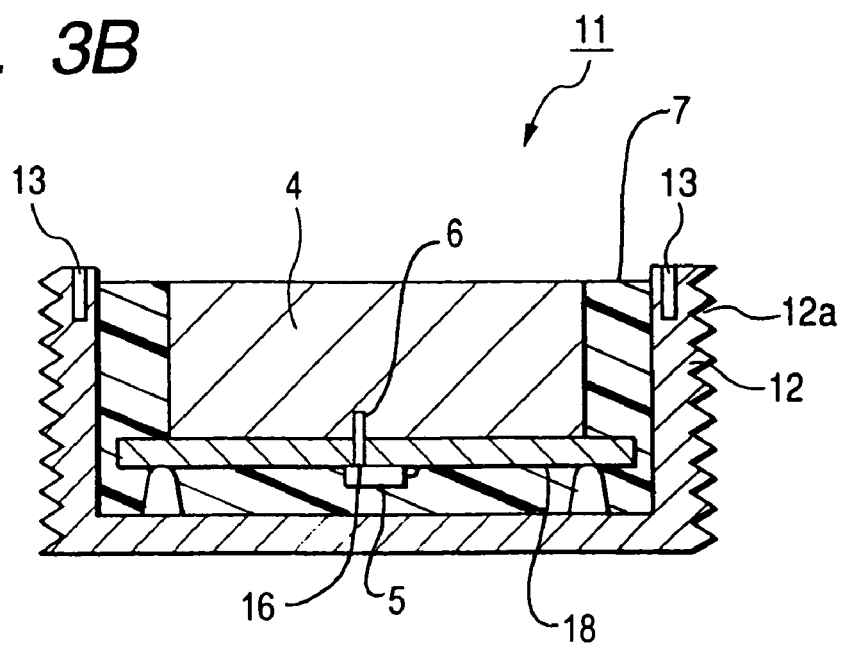

FIGS. 3A and 3B are views showing a structure of a radio frequency IC tag according to a second preferred embodiment of the present invention. FIG. 3A is a top view, and FIG. 3B is a cross-sectional view taken along line C-C of FIG. 3A.

The structure of a radio frequency IC tag 11 according to the second embodiment differs from that of the radio frequency IC tag 1 according to the first embodiment in the following points only. Specifically, a thread 12a is machined on the outer peripheral surface of an outer casing 12 and a plurality of mounting jig holes 13 are provided in the upper end surface of the outer casing. The same material as in the first embodiment is used for the outer casing 12. Possible types of materials include metal, such as iron, stainless steel, aluminum, or the like, and resin, such as PVC, ABS, or the like. The construction of the radio frequency IC tag 11 is otherwise the same as that shown in FIGS. 1A to 1C. The description of the remainder of the radio frequency IC tag 11 will therefore be omitted.

Figure 4A:
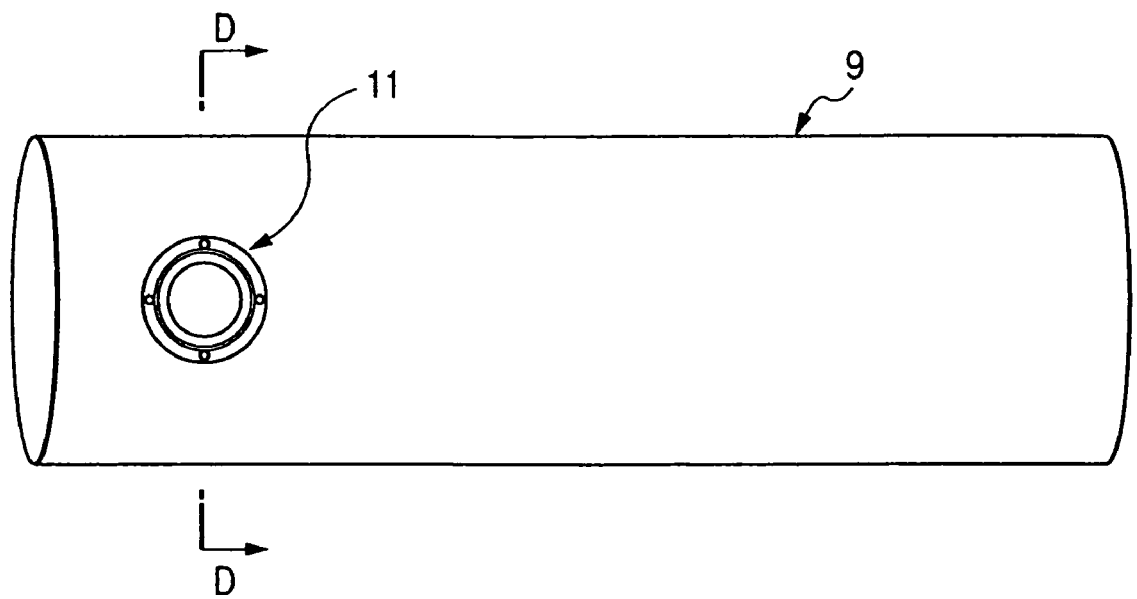
FIGS. 4A and 4B are views showing a state in which the radio frequency IC tag shown in FIGS. 3A and 3B is mounted on a metal bar, FIG. 4A being a perspective view showing the appearance of the radio frequency IC tag mounted on the metal bar, and FIG. 4B being an enlarged fragmentary cross-sectional view taken along line D-D of FIG. 4A.
Figure 4B:
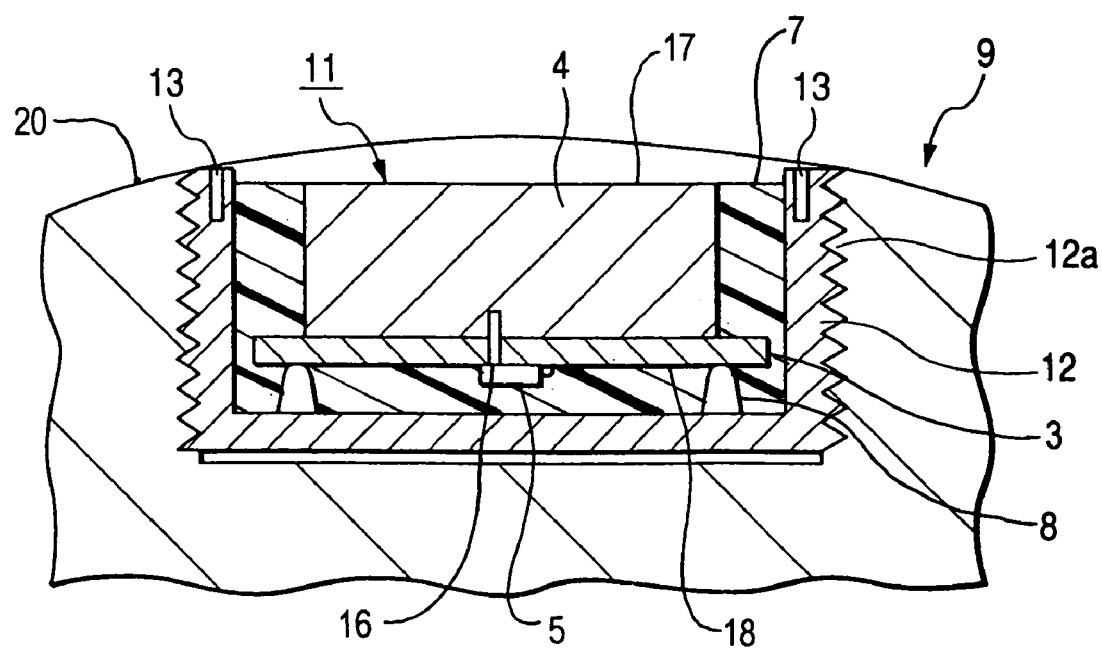

FIGS. 4A and 4B are views showing a state in which the radio frequency IC tag 11 shown in FIGS. 3A and 3B is mounted on a metal bar 9. FIG. 4A is a perspective view showing the appearance of the radio frequency IC tag 11 mounted on metal bar 9. FIG. 4B is an enlarged fragmentary cross-sectional view taken along line D-D of FIG. 4A. Specifically, a thread groove having a desired diameter and a desired depth is formed in a metal bar 9 in advance. A mounting jig (not shown) is inserted in the mounting jig holes 13 provided in the upper end surface of the outer casing 12' and the radio frequency IC tag 11 is then screwed into the metal bar 9. The radio frequency IC tag 11 is secured in the metal bar 9 with head 17 of antenna radiation portion 4 being substantially flush with a surface 20 of the metal bar 9. This allows the radio frequency IC tag 11 to be stably secured in the metal bar 9 without allowing the radio frequency IC tag 11 to protrude from the surface of the metal bar 9. The metal bar 9 can be machined in the same manner as in the first embodiment after the radio frequency IC tag 11 has been screwed into metal bar 9.

Embodiment 3

Figure 5:
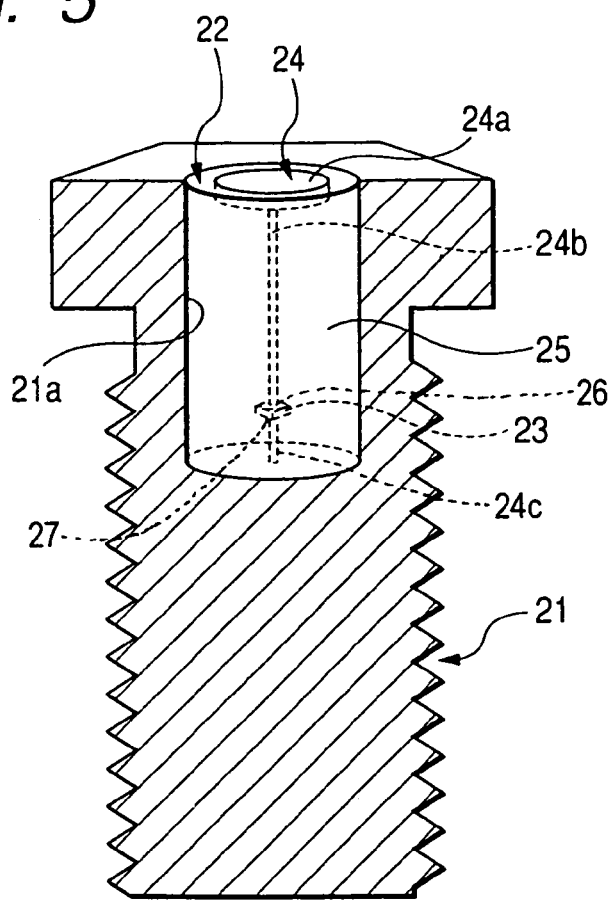
FIG. 5 is a view showing a radio frequency IC tag mounted in a structure according to a third preferred embodiment of the present invention.

FIG. 5 is a view showing a radio frequency IC tag mounted in a structure according to a third preferred embodiment of the present invention. Specifically, a hole 21a having a desired diameter and a desired depth is made in a head of a bolt 21 as a controlled material and a radio frequency IC tag 22 is embedded in the hole 21a for use with the bolt. An antenna 24 of the radio frequency IC tag 22 includes a disk 24a having a diameter smaller than that of the hole 21a. A connection wire 24b is extended from a center of the disk 24a and connected to a first electrode terminal 26 of an IC chip 23. A second electrode terminal 27 of the IC chip 23 is connected to the bolt 21 by connection wire 24c.

The distance between the disk 24a and the first electrode 26 of the IC chip 23 is set to λ/4 when a wavelength of the radio wave to be used on a sealing agent 25 (antenna substrate) is λ. An antenna 24 as a monopole antenna is configured as described in the foregoing. Radio waves can then be radiated from the disk 24a located on a surface portion of the head of the bolt 21.

The radio frequency IC tag 22 is secured in the bolt 21 as below. Specifically, with the IC chip 23 and the like housed in the hole 21a in the bolt 21, the disk 24a is fixed at a position substantially flush with the surface of the head of the bolt 21. Then, the sealing agent 25, such as an epoxy resin or the like used as a semiconductor packaging material, is injected into the hole 21a and then cured.

When a reader (not shown) is brought near to the bolt 21, the reader can relatively easily receive radio waves from the antenna 24, thereby reading information stored on the IC chip 23 without being affected by the bolt 21 that may be made of metal.

Embodiment 4

Figure 6:
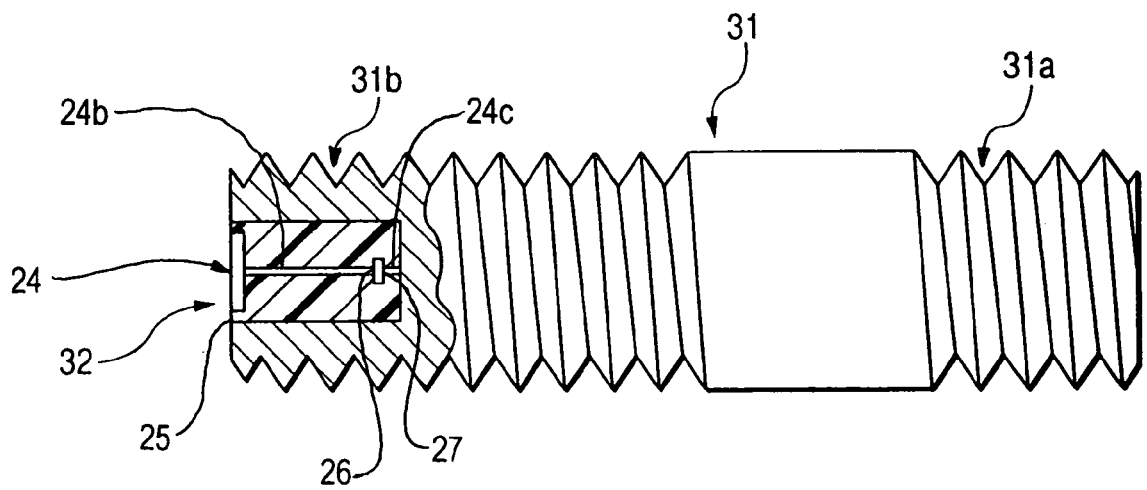
FIG. 6 is a view showing a radio frequency IC tag mounted in a structure according to a fourth preferred embodiment of the present invention.
Figure 7A:
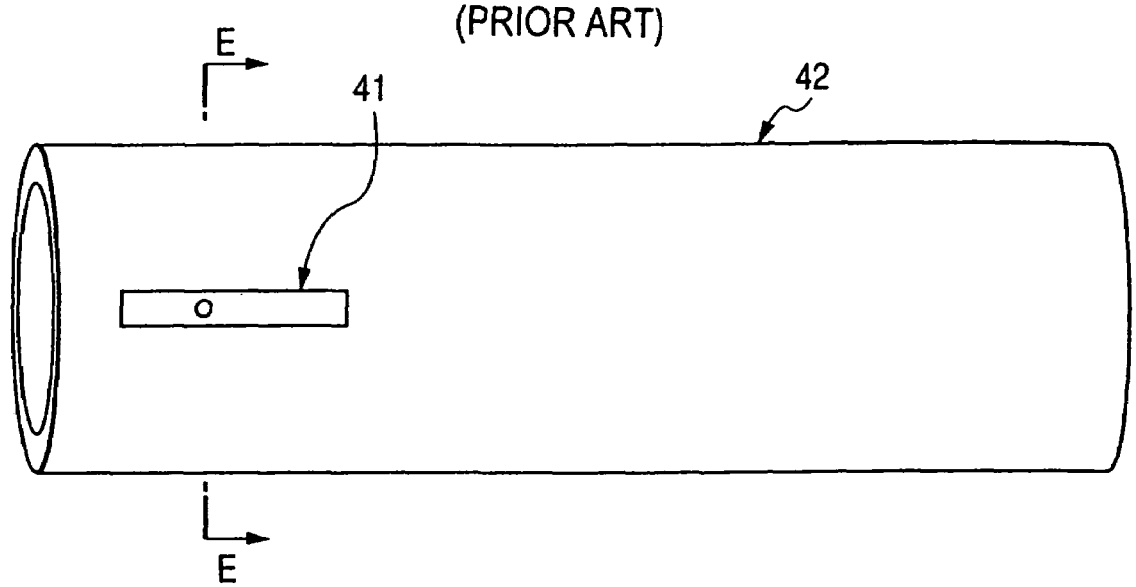
FIGS. 7A and 7B are views showing a state in which the conventional radio frequency IC tag is mounted on a metal pipe, FIG. 7A being a perspective view showing the appearance thereof, and FIG. 7B being a fragmentary cross-sectional view taken along line E-E of FIG. 7A.
Figure 7B:
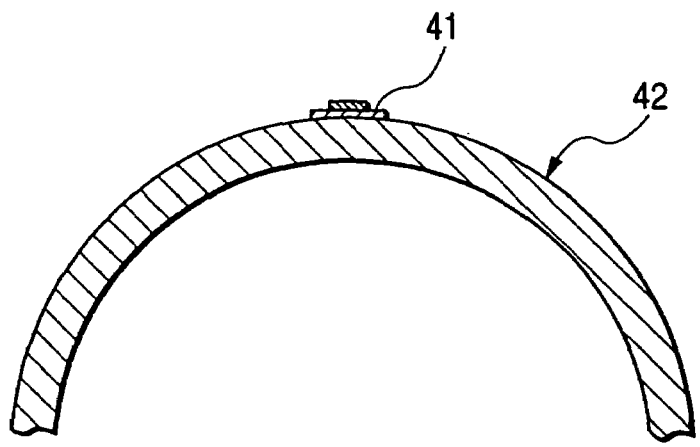

FIG. 6 is a view of a radio frequency IC tag mounted in a structure according to a fourth preferred embodiment of the present invention. A stud bolt 31 is herein used as a controlled material. Specifically, a radio frequency IC tag 32 can be embedded in a head of a part-fixing portion 31b of the stud bolt 31 by following the procedure as described with reference to FIG. 5. When a main body fixing portion 31a of the stud bolt 31 embedded with the radio frequency IC tag 32 is fixed to a structure (not shown), an assembly member can be screwed and mounted to the part fixing portion 31b. The specific assembly member screwed together to the stud bolt 31 can then be identified and managed by reading information stored in the radio frequency IC tag 32 fixed to the head of the stud bolt 31.

According to the present invention, the function offered by the IC tag may be protected intact even if a surface of a metal pipe or a metal bar is reground or otherwise machined after the radio frequency IC tag has been mounted in the metal. The radio frequency IC tag according to the present invention can be mounted in a metal material and effectively utilized in, for example, a building structure or the like. Moreover, the radio frequency IC tag can be embedded in a bolt. It is therefore possible to control a mounting position and details of a part in an engine, a machine tool, or other metallic equipment. The radio frequency IC tag can therefore effectively support assembly work of complicated structures.

The radio frequency IC tags according to the embodiments as described in the foregoing can be embedded in a metal bar or a metal pipe through press-fitting or screwing the tag until the tag is flush with a surface of the metal bar or the metal pipe. The radio frequency IC tag can therefore be secured to the metal bar or the metal pipe without allowing the tag to protrude from the surface of the metal bar or pipe. The radio frequency IC tag can be effectively prevented from coming off or being damaged during handling of the metal bar or the like. Reliability in use of the radio frequency IC tag can therefore be even more enhanced.

In addition, the antenna radiation portion is exposed on the surface of the metal bar or the metal pipe. A high degree of antenna directivity can therefore be maintained to allow the antenna radiation portion to receive radio waves accurately. The reader can therefore read information stored on the radio frequency IC tag even more accurately and positively.

According to the bolt with an IC tag according to the embodiments as described in the foregoing, the radio frequency IC tag is housed in a hole in the head of the bolt. The radio frequency IC tag can therefore be prevented from coming off from the bolt or being damaged.

The antenna of the radio frequency IC tag includes the disk disposed on the surface of the bolt head. The distance between the electrode terminals of the IC chip electrically connected to the disk through the connection wire is set according to the wavelength λ of the radio wave on the antenna substrate. When the antenna constitutes a monopole antenna in this condition, the antenna can receive radio waves accurately with high antenna directivity maintained.

While specific embodiments have been illustrated and described in this specification as examples of the best mode of the invention presently contemplated, those of ordinary skill in the art will appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one, and the exemplary embodiments set forth above should not unduly limit the scope of the claims. Thus, the scope of the invention should properly be determined with reference to the appended claims, along with the full range of equivalents to which such claims are entitled.

What is claimed is:

1. A radio frequency IC tag including an IC chip for storing information and an antenna of a microstrip structure for transmitting wirelessly the information stored on the IC chip, the radio frequency IC tag comprising:

an antenna substrate, on a first surface of which the IC chip is mounted at a substantial center of the first surface, and which has a ground pattern formed over a remainder of the first surface and electrically connected to a first electrode terminal of the IC chip, the antenna substrate having a predetermined dielectric constant;

an antenna radiation portion mounted on a second surface of the antenna substrate and electrically connected to a second electrode terminal of the IC chip; and a metallic outer casing accommodating therein the antenna substrate and the antenna radiation portion, wherein a height of the antenna radiation portion is set to a value greater than a machining margin, and wherein said ground pattern is formed within the metallic outer casing, and separated from the metallic outer casing by a predetermined space.

2. The radio frequency IC tag according to claim 1, wherein the outer casing has an cylindrical outer surface or a threaded outer surface.

3. The radio frequency IC tag according to claim 2, wherein the antenna radiation portion is formed into a cylindrical column having a diameter set to λ/2 when a wavelength of a radio wave to be used on the antenna substrate is λ and a head of the cylindrical column of the antenna radiation portion is substantially flush with an upper edge of the outer casing.

4. The radio frequency IC tag according to claim 3,
wherein the diameter of the antenna radiation portion is established based on the dielectric constant of the antenna substrate.

5. The radio frequency IC tag according to claim 3,
wherein a height of the antenna radiation portion is set according to a machining margin of a controlled material on which the radio frequency IC tag is mounted.

6. A metallic bolt with an IC tag including an IC chip for storing information and a monopole antenna for transmitting wirelessly the information stored on the IC chip,
wherein a hole adapted to receive the radio frequency IC tag is formed in a head of the metallic bolt and the radio frequency IC tag is received in the hole, and
wherein the monopole antenna includes a disk disposed at a position corresponding to a surface of the head of the metallic bolt, and a connection wire is extended from a center of the disk and connected to an electrode terminal of the IC chip.

7. The bolt with an IC tag including an IC chip for storing information and an antenna for transmitting wirelessly the information stored on the IC chip,
wherein a hole adapted to receive the radio frequency IC tag is formed in a head of the bolt and the radio frequency IC tag is received in the hole, and
wherein the antenna includes a disk disposed at a position corresponding to a surface of the head of the bolt, a connection wire is extended from a center of the disk and connected to an electrode terminal of the IC chip, a distance between the disk and the electrode terminal of the IC chip is set to $\lambda/4$ when a wavelength of a radio wave to be used on an antenna substrate is $\lambda$, and the antenna constitutes a monopole antenna.

8. The radio frequency IC tag according to claim 1,
wherein a through electrode penetrates through the antenna substrate, extending from the first surface to above the second surface of the antenna substrate, the second electrode terminal of the IC chip being connected to the antenna radiation portion by the through electrode.

9. The radio frequency IC tag according to claim 8,
wherein the through electrode is disposed offset from a center of the antenna radiation portion to achieve impedance matching.

10. A radio frequency IC tag including an IC chip for storing information and an antenna of a microstrip structure for transmitting wirelessly the information stored on the IC chip, the radio frequency IC tag comprising:
an antenna substrate having a predetermined dielectric constant, said substrate having the IC chip mounted on a first surface thereof, and having a ground pattern formed over a portion of the first surface, said ground pattern being electrically connected to a first electrode terminal of the IC chip;
an antenna radiation portion mounted on a second surface of the antenna substrate and electrically connected to a second electrode terminal of the IC chip; and
metallic outer casing accommodating therein the antenna substrate and the antenna radiation portion,
wherein a height of the antenna radiation portion is set to a value greater than a machining margin, and
wherein said ground pattern is formed within the metallic outer casing, and separated from the metallic outer casing by a predetermined space.

11. The radio frequency IC tag according to claim 10,
wherein the outer casing has an cylindrical outer surface or a threaded outer surface.

12. The radio frequency IC tag according to claim 11,
wherein the antenna radiation portion is formed into a cylindrical column having a diameter set to $\lambda/2$ when a wavelength of a radio wave to be used on the antenna substrate is $\lambda$ and a head of the cylindrical column of the antenna radiation portion is substantially flush with an upper edge of the outer casing.

13. The radio frequency IC tag according to claim 12,
wherein the diameter of the antenna radiation portion is established based on the dielectric constant of the antenna substrate.

14. The radio frequency IC tag according to claim 12,
wherein a height of the antenna radiation portion is set according to a machining margin of a controlled material on which the radio frequency IC tag is mounted.

15. The radio frequency IC tag according to claim 10,
wherein a sealing agent is injected into the casing for sealing the radio frequency IC tag.

16. The radio frequency IC tag according to claim 10,
wherein support members are included for controlling a height of the antenna substrate relative to a bottom portion of the outer casing.

17. The radio frequency IC tag according to claim 10,
wherein a through electrode penetrates through the antenna substrate, extending from the first surface to above the second surface of the antenna substrate, the second electrode terminal of the IC chip being connected to the antenna radiation portion by the through electrode.

18. The radio frequency IC tag according to claim 17,
wherein the through electrode is disposed offset from a center of the antenna radiation portion to achieve impedance matching.

* * * * *